Dec. 3, 1963   R. O. WILSON   3,112,562
METHOD OF ASSEMBLING CLINCH PINS
Filed Feb. 24, 1959   6 Sheets-Sheet 1

INVENTOR.
RAYMOND O. WILSON
BY C. G. Stratton
ATTORNEY

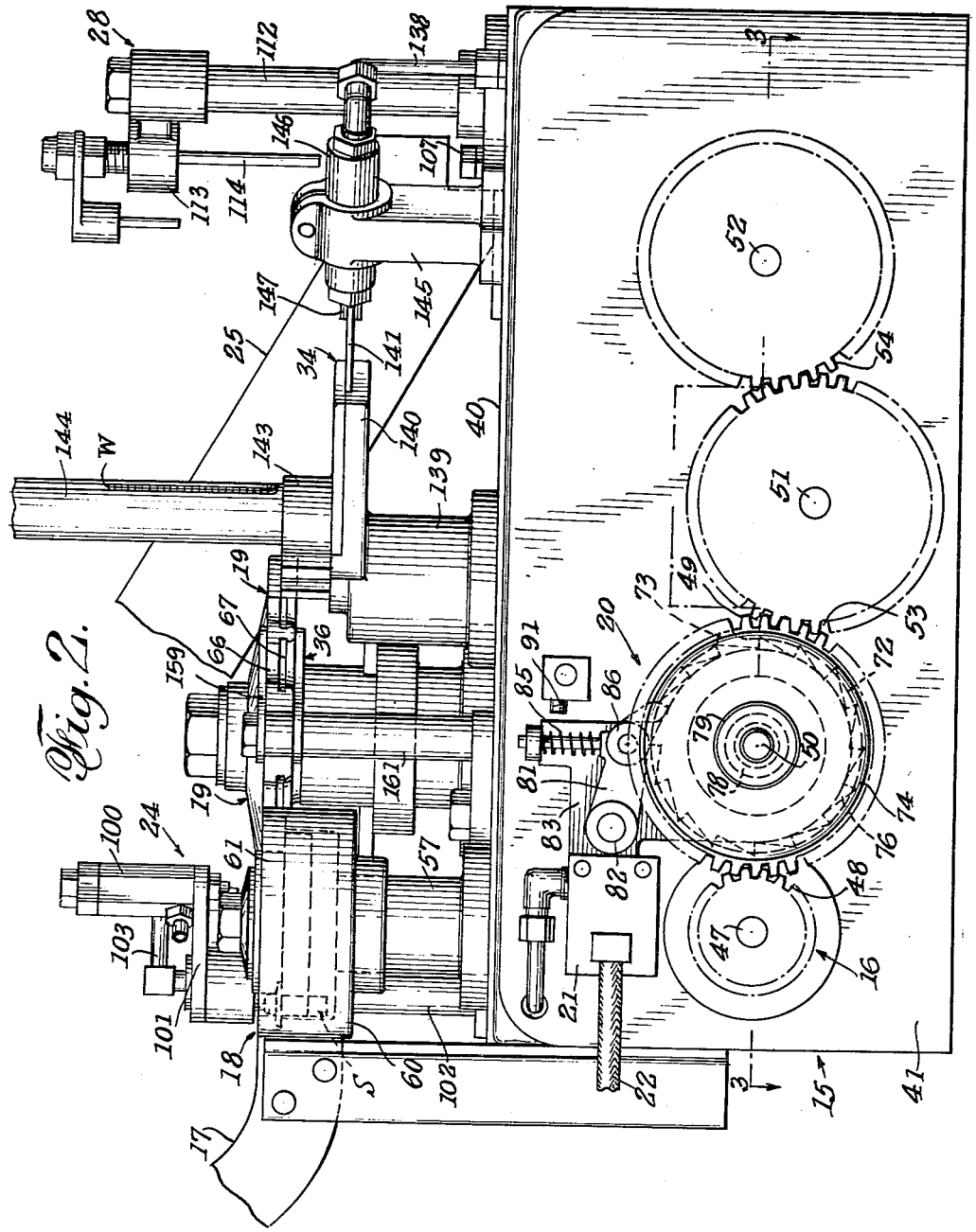

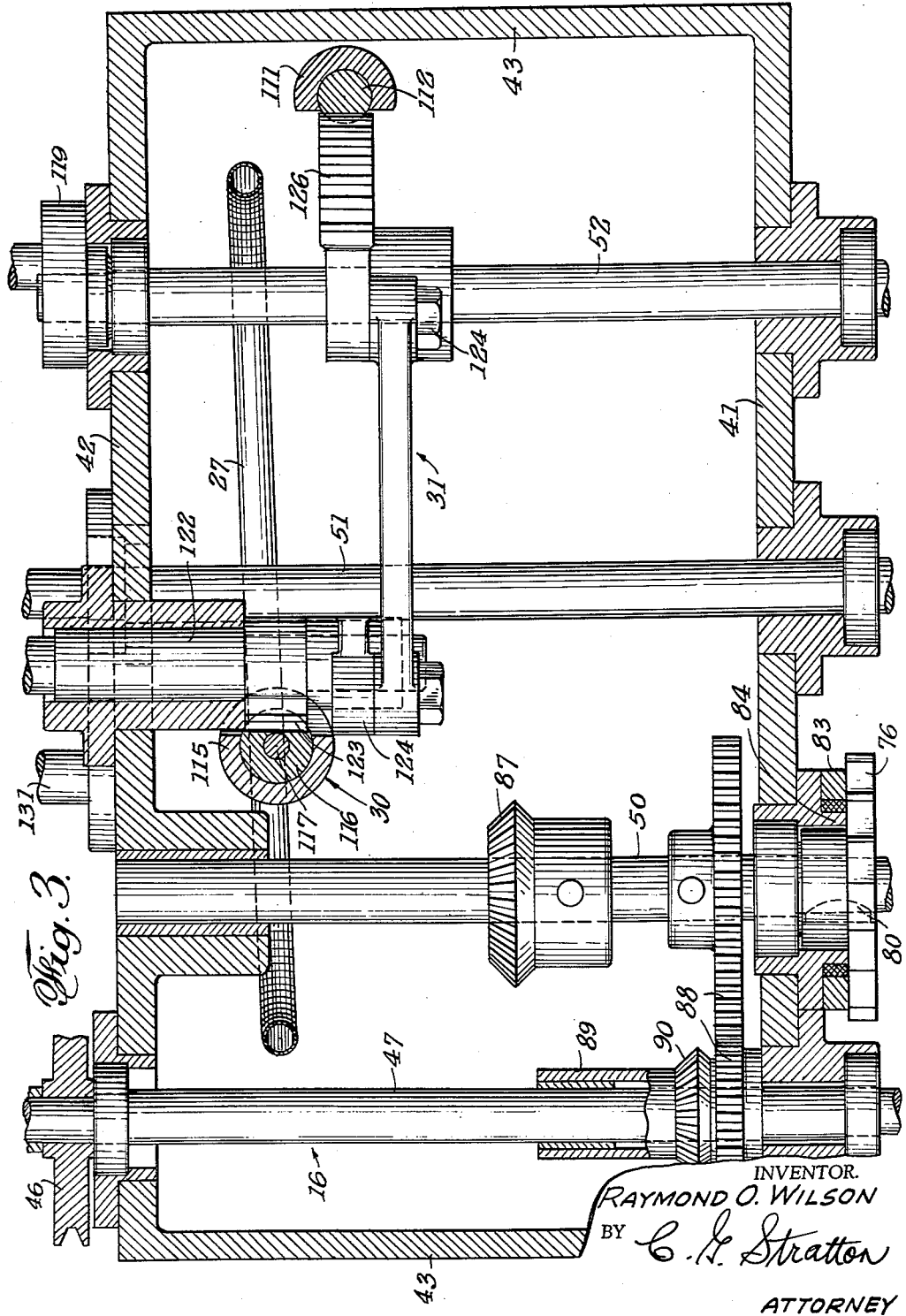

Dec. 3, 1963    R. O. WILSON    3,112,562
METHOD OF ASSEMBLING CLINCH PINS
Filed Feb. 24, 1959    6 Sheets-Sheet 4
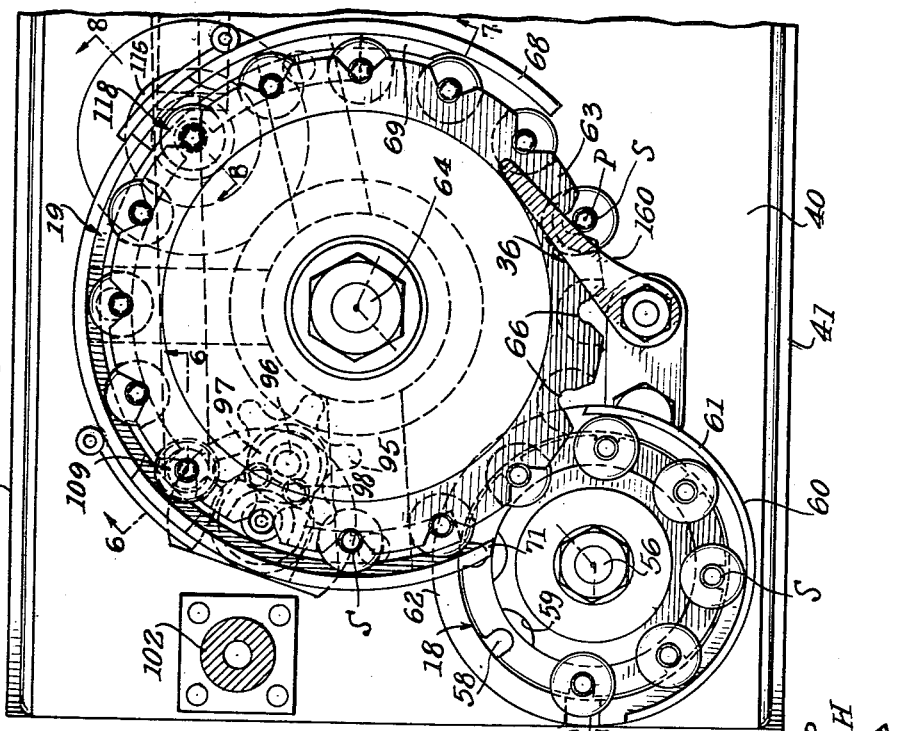
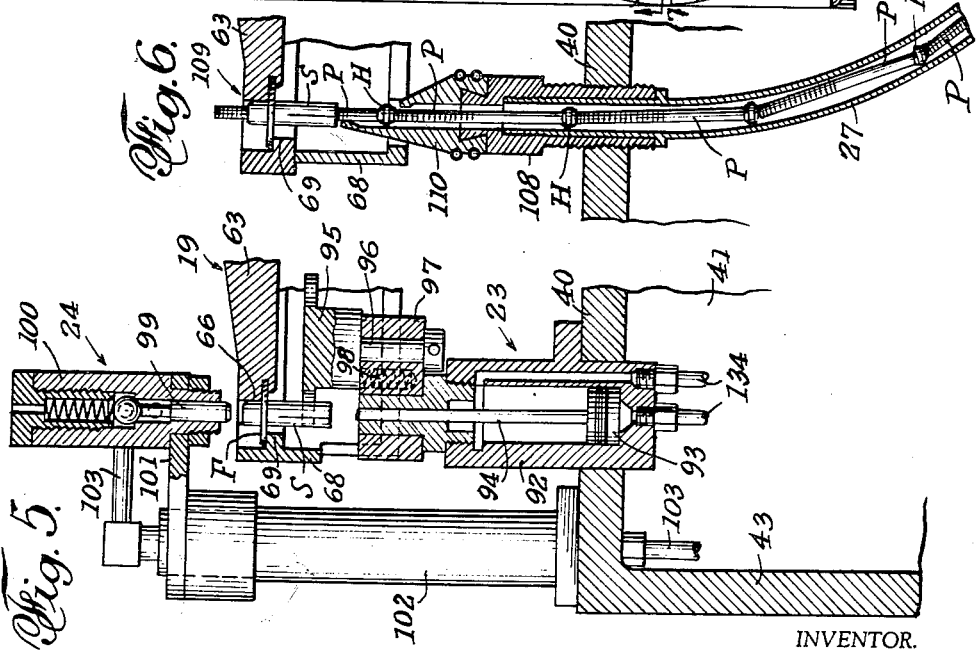
INVENTOR.
RAYMOND O. WILSON
BY C. G. Stratton
ATTORNEY Dec. 3, 1963  R. O. WILSON  3,112,562
METHOD OF ASSEMBLING CLINCH PINS
Filed Feb. 24, 1959  6 Sheets-Sheet 5
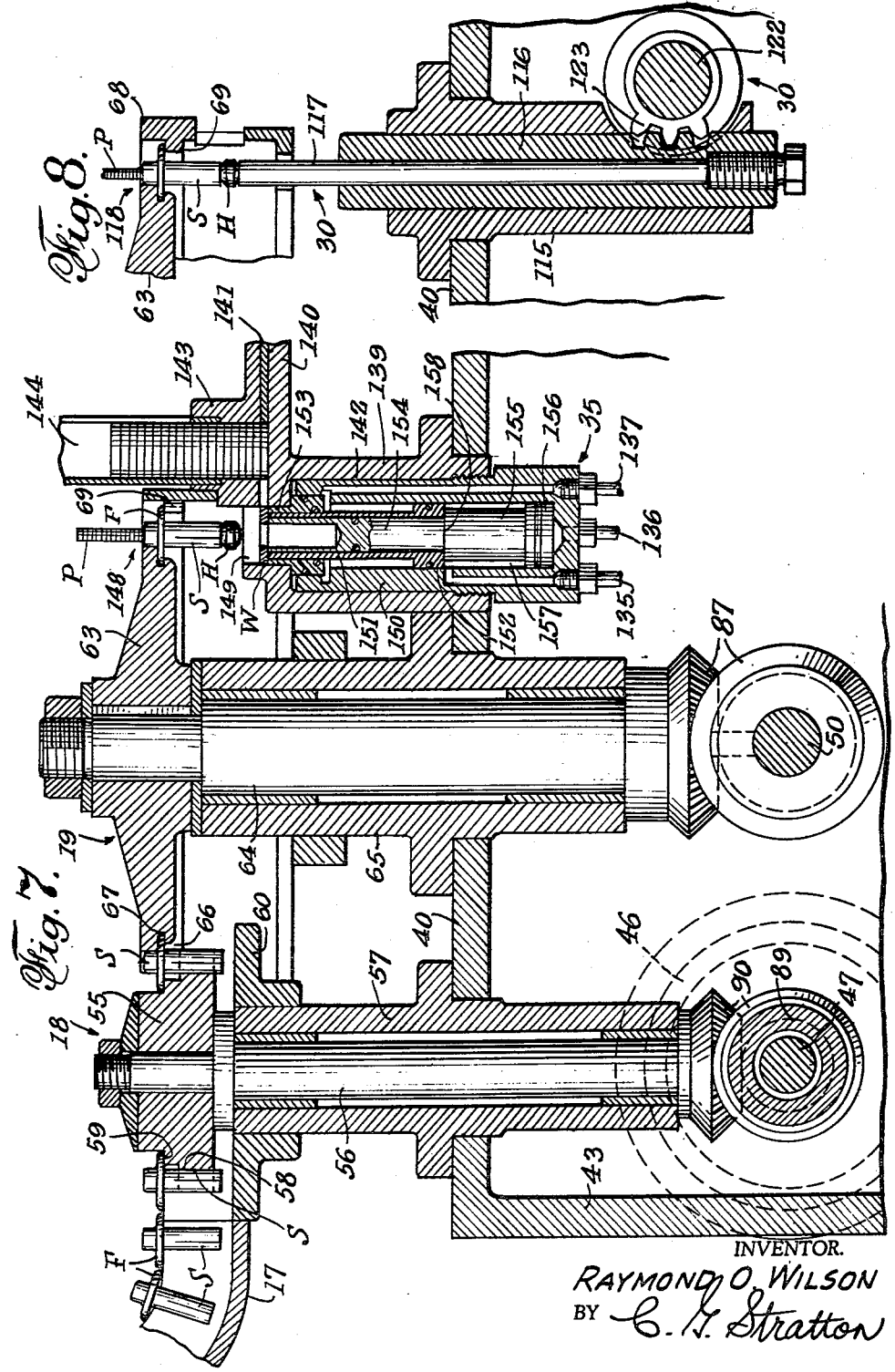
INVENTOR.
RAYMOND O. WILSON
BY C. G. Stratton
ATTORNEY Dec. 3, 1963 R. O. WILSON 3,112,562
METHOD OF ASSEMBLING CLINCH PINS
Filed Feb. 24, 1959 6 Sheets-Sheet 6
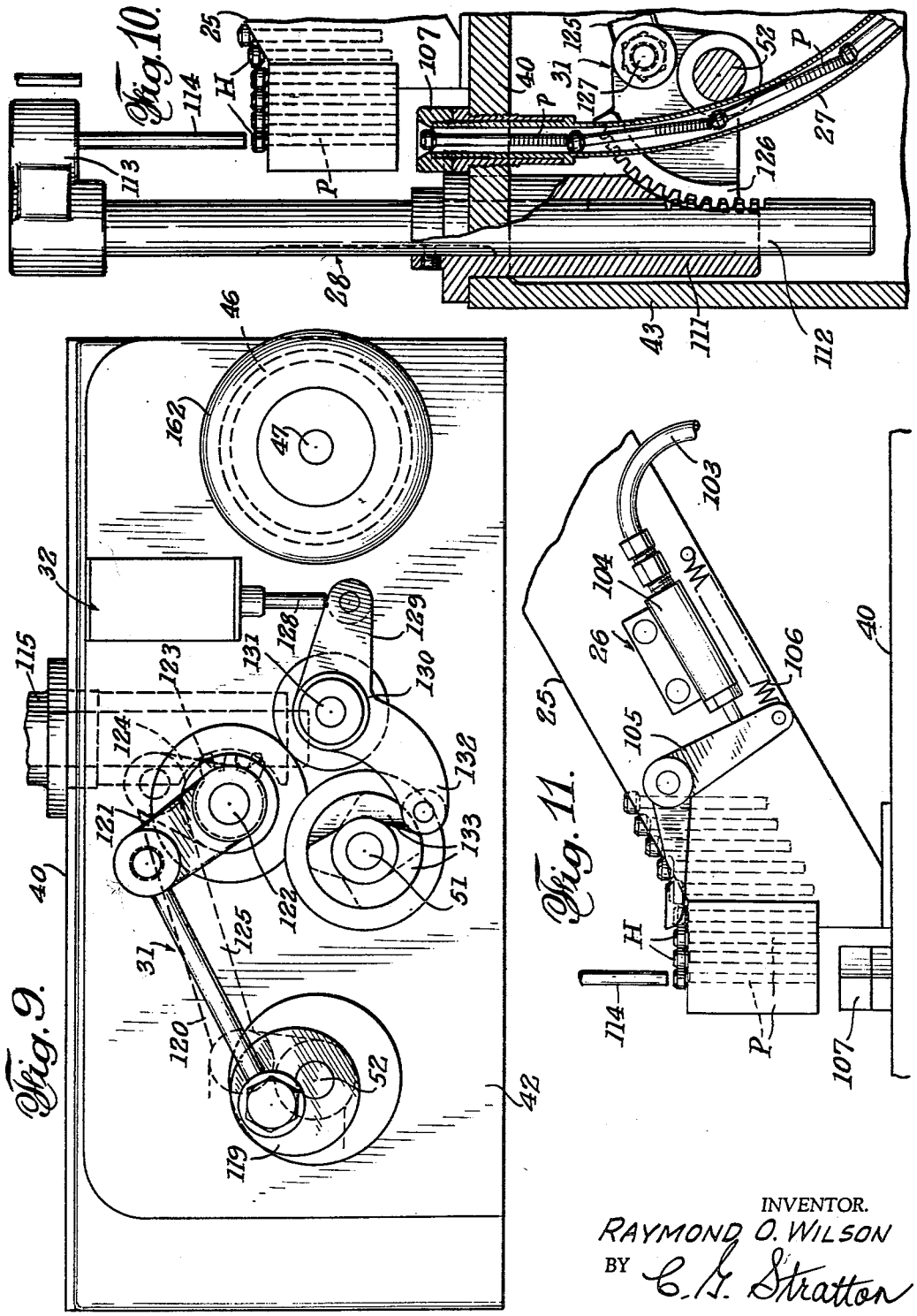
INVENTOR.
RAYMOND O. WILSON
BY C. G. Stratton
ATTORNEY

United States Patent Office 3,112,562
Patented Dec. 3, 1963

3,112,562
METHOD OF ASSEMBLING CLINCH PINS
Raymond O. Wilson, San Marino, Calif., assignor to Olympic Screw & Rivet Corporation, Los Angeles, Calif., a corporation of California
Filed Feb. 24, 1959, Ser. No. 795,026
7 Claims. (Cl. 29—430)

This invention relates to a method of assembling the components of a clinch pin that is known in the trade as a high clinch pin or rivet and has for an object to provide an automatic mechine that assembles the sleeve and pin components of such devices and provides the same with a sealing washer, thereby obviating hand assembly heretofore used.

A high clinch pin usually comprises an outer sleeve that is formed with an enlarged outer flange nearer one end than the other and with the longer sleeve portion slitted longitudinally, and a pin longer than said sleeve having a head at one end and an elongated threaded or annularly grooved stem at the other end and with an intermediate break-away groove. Said grooved stem extends through the sleeve with the head of the pin disposed against the end of the sleeve that has the slits and the stem extending substantially beyond the short end of the sleeve. Such a high clinch pin is completed ready for use by the provision of a compressible washer on the slitted end of the sleeve and disposed against the flange. In use, the clinch pin is placed with the washer against a surface of members to be fastened together and with the slitted end of the sleeve with the head of the pin protruding into and through a hole in said members. Now, by applying a tool that bucks against the washer while gripping the grooved stem and pulling thereon, the head of the pin outwardly curls the slit-defined portions of the sleeve and clinches the same over the opposite surface of the members being fastened. Continued pull on the stem causes the same to break away at the break-away groove, leaving the clinch pin in place with the washer compressed to seal around the mentioned hole in the members thus fastened.

Another object of the present invention is to provide a method of the character above referred to that provides feed of clinch sleeves and pins to a point where the pin is telescopically entered into the sleeve so that the pin head is at one end of the assembly and the sleeve flange adjacent the other end and thereafter further telescopically pushing the pin into the sleeve until the head thereof engages or is closely adjacent to the end of the sleeve portion that is slitted.

A further object of the invention is to provide a clinch pin assemblying method that automatically coordinates the pin and sleeve by inverting the former from a stem-down position while being fed to the machine and a stem-up position for entry into the sleeve while the latter is being held by its flange with the slitted portion below the flange, said disposition of the sleeve being the disposition it has while being fed to the machine. From the foregoing, it will be recognized that the sleeves and pins are advantageously fed to the machine while being suspended, respectively, from their flanges and heads. The machine provides novel and improved means to invert the pins after they reach the machine so that proper assembly with the sleeves may be effected.

A further object of the invention is to provide control of the feed of pins by means of a properly positioned sleeve, thereby preventing pin feed in the event that the feed of sleeves has not been properly carried out.

A still further object of the invention is to provide an assembling method as above in which the cycle of operation includes pressing a resilient washer over the pin head and in position against the sleeve flange as before described.

A yet further object of the invention is to provide for a two-part movement of the washer; first, to move the washer bodily to the head of the clinch pin while pushing on the peripheral or marginal portions of the washer so that the same assumes a conically concave form when the inner portion around the washer hole encounters said head, and, then, to force said inner portion of the washer over the pin head. Thus, the flexible washer is efficiently applied to prevent tearing thereof or other faulty malforming.

A still further object of the invention is to provide an assembling method as above contemplated that provides for an intermittent advance of a plurality of sleeves and pin-assembled sleeves and a cyclic operation that assembles sleeves and pins and then washers onto the assembled sleeves and pins during the periods of rest between advance movements.

The invention also has for its objects to provide such means that are positive in operation, convenient in use, easily installed in a working position and easily disconnected therefrom, economical of manufacture, relatively simple, and of general superiority and serviceability.

The invention also comprises novel details of construction and novel combinations and arrangements of parts, which will more fully appear in the course of the following description. However, the drawings merely show and the following description merely describes, one embodiment of the present invention, which is given by way of illustration or example only.

In the drawings, like reference characters designate similar parts in the several views.

FIG. 2 is a side elevational view of the machine, with the guard on that side removed to show the mechanism.

FIG. 3 is an enlarged cross-sectional view as taken on the line 3—3 of FIG. 2.

FIG. 4 is a similarly enlarged and detailed plan view of pin-advancing means such as shown in FIG. 1.

FIG. 5 is a vertical sectional view as taken on line 5—5 of FIG. 1.

FIG. 6 is a vertical sectional view as taken on line 6—6 of FIG. 4.

FIG. 7 is a vertical sectional view as taken on line 7—7 of FIG. 4.

FIG. 8 is a vertical sectional view as taken on line 8—8 of FIG. 4.

FIG. 9 is a fragmentary side view of the machine as seen from the side opposite to FIG. 2.

FIG. 10 is an enlarged vertical sectional view as taken on the line 10—10 of FIG. 1.

FIG. 11 is a fragmentary side view of the pin-feeding means of the machine.

Figure 1:
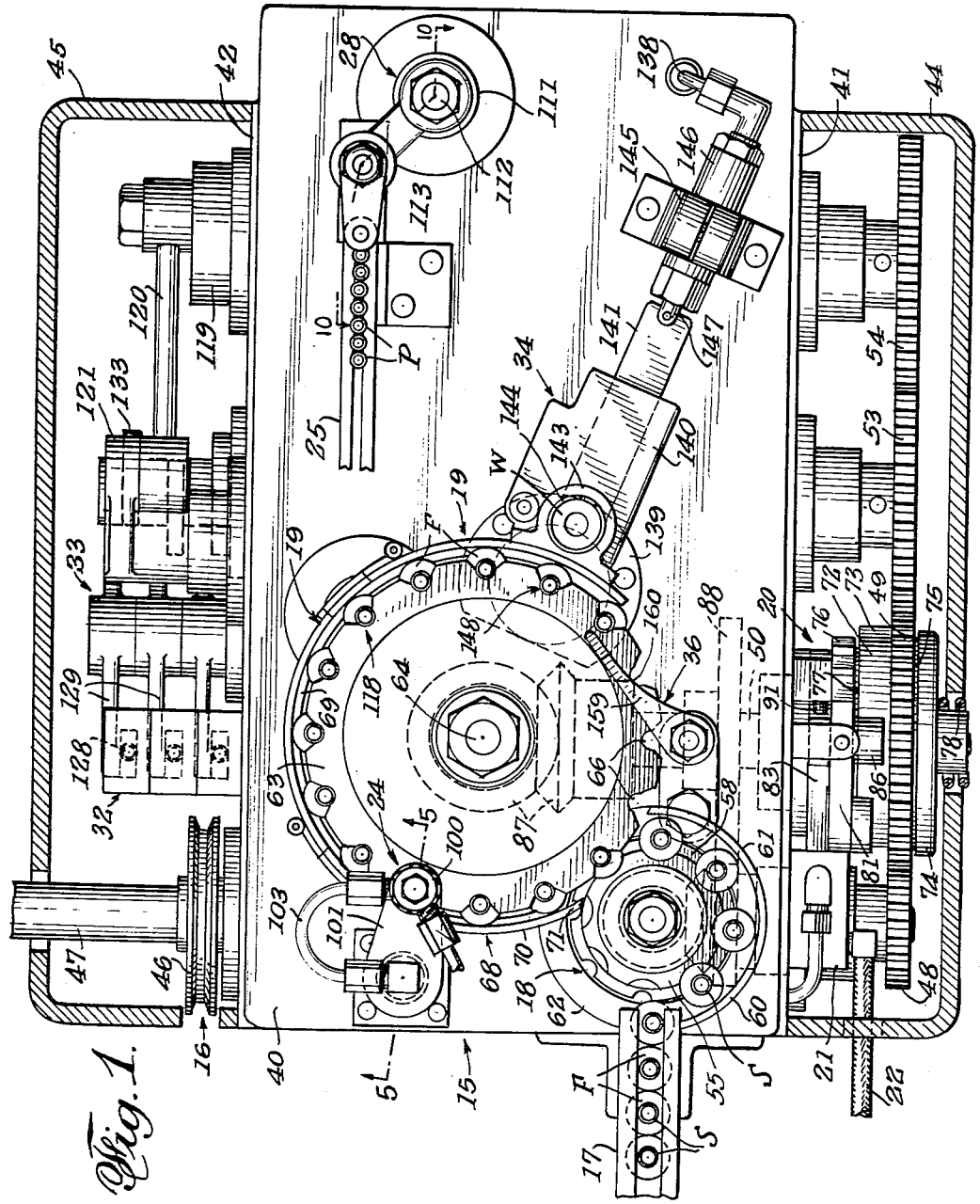
FIG. 1 is a top plan view of a high clinch pin assembling machine, the same embodying a preferred form of the present invention, the guards of portions of the machine being shown in section.

The machine that is illustrated comprises, generally, a base 15, a continuous drive 16 mounted in the base, a chute 17 for supplying sleeves S in one-by-one sequence to the machine, sleeve-transporting means 18 that receives sleeves from the chute 17, index means 19 that receives sleeves transported thereto by the means 18, an intermittent drive 20 between the continuous drive 16 and said means 18 and 19 to drive the latter means intermittently, a control valve 21 operated by the mechanism of the drive 20 to control inlet of pressure air from a source indicated by an air hose 22, feeler means 23, operated by compressed air, to test whether a sleeve S is in proper position in the means 19, a valve 24 controlled by the means 23 when a sleeve is in proper position, a chute 25 for headed pins P for supplying the same in one-by-one sequence to the machine, means 26 controlled by air passing through valve 24 to effect pin feed, a guide tube 27 for pins P discharged from the chute 25 to conduct the same, in inverted condition, to a station in register with a sleeve S in the means 19, means 28 for feeding pins P through said tube by pushing on a pin at the end of chute 25 so that the same displaces all of the pins in the guide tube and thereby discharges the pin P at the opposite end of the tube and enters the same into the sleeve at the station in register therewith, means 30 for pushing against the head of a pin so entered to fully project the pin into the sleeve, drive means 31 to drive the means 30 and connected to drive the nail-feeding means 28, a complement of air-controlling valves 32 for supplying air to control various components of the machine, means 33 to control the operation of said valves 32 in such synchrony, as desired, means 34 to supply washers for feed to a pin-provided sleeve and controlled by one of the valves 32, means 35 for placing a washer supplied by the means 34 onto the sleeve of a clinch pin and pressing said washer against the flange F of said clinch pin, and means 36 for dislodging assembled clinch pins from the means 19.

The base 15 is shown as a generally rectangular housing having a top wall 40, side walls 41 and 42, and end walls 43. The interior of this housing is hollow, as shown. Guard housings 44 and 45 may be provided to enclose such portions of the present mechanism that project outwardly of the respective walls 41 and 42. FIG. 1 best shows this arrangement.

The continuous drive 16 is shown as a driven pulley 46 outward of base wall 42 and mounted on a shaft 47 that spans between the walls 41 and 42 and extends outwardly beyond said wall 41. Said shaft extension is provided with a gear 48, a gear 49 on a shaft 50 is in mesh with and is driven with gear 48 by the pulley 46 (or other driven or driving means). The shaft 50 extends between and has bearing in the base walls 41 and 42. The gear 49 is loose on shaft 50 and does not itself drive said shaft as will later be clear. The drive 16 further includes two additional shafts 51 and 52 that also span between the base walls 41 and 42 and are provided with gears 53 and 54, respectively. Since gears 49 and 53 are in mesh and gears 53 and 54 are in mesh, the shafts 51 and 52 are continuously driven. Shafts 51 and 52 have extensions beyond wall 42, as can be seen from FIGS. 3 and 9.

The sleeve chute 17 is quite typical and may be fed in the usual way from a tumbling hopper so that sleeves S may be fed, as shown in FIG. 7, to the sleeve-receiving means 18. It will be noted from FIG. 7 that the sleeves are suspended by their flanges F in such manner that the longer slitted portion of the sleeve is pendant. Such a feed of sleeve is provided because of the normal tendency of the longer sleeve portion to be pendant and may be assured by preventing a reverse position of any of the sleeves before the same enter the chute 17. Such means is not shown because the same is generally conventional and forms no part of the present invention. In any case, the sleeves S are brought to the means 18 with the slitted portion thereof down.

The sleeve transporting means 18 is shown as comprising a sleeve disc 55 that is mounted on a vertical shaft 56 normal to the shaft 47 and in register therewith, as can be seen from FIG. 7. Said shaft 56 is housed in a bearing 57 that is mounted on the top wall 40 of the base. The disc 55 is provided with a set of uniformly spaced seats or recesses 58 that are provided in the margin of said disc. Said recesses, as they move by the exit end of chute 17 receive sleeves S, the flanges F of the sleeves coming to rest upon the ledges 59 and the lower slitted portions of the sleeves depending below said ledges and housed in the recesses. FIG. 7 shows this arrangement.

The means 18 also includes a guard 60 that has a wall 61 which retains the sleeves in their seats during transport from the receiving to the discharging stations thereof, and an annular ledge 62 on which the flanges F of sleeves thus transported slide so that the sleeves retain a desired vertical position during transportation.

The means 19 is shown as comprising a sleeve-indexing disc 63 that is mounted on a vertical shaft 64 normal to the shaft 50 and in register therewith, as can be seen from FIG. 7. Said shaft 64 is housed in a bearing 65 that is mounted on the top wall 40 of the base. Said disc 63 is provided with a set of uniformly spaced marginal recesses or seats 66 that are designed to receive sleeves S and accommodate the same without undue play. Each recess 66 is formed to have a flange-housing recess part 67 and a recess part that houses the smaller unslitted end of the sleeve above the flange thereof.

A guard 68 is provided around the periphery of disc 63 and the same is provided with an inreaching flange or ledge 69 that serves as a support for the sleeve flanges F as the sleeves are moved in index from station to station and with a retaining wall 70 that holds the sleeves in their seats.

From FIGS. 1, 4 and 7 it will be seen that the guard walls 61 and 70 are cut away or interrupted where the discs 55 and 63 are tangent, thus enabling transfer of sleeves from the seats 58 of disc 55 to seats 66 of disc 63 at the point of such tangency. The end 71 of guard wall 68 serves to strip the sleeves out of the recesses or seats 58 and bias them to enter recesses or seats 66. The guard wall 68 and the flange or ledge 69 are further interrupted between the station at which the washers are applied and where the completely assembled clinch pins are discharged, thereby enabling such discharge of fully assembled sleeves.

In this case, disc 63 is shown with twice as many recesses as are in disc 55. Thus, it will require two revolutions of disc 55 for each one revolution of disc. The intermittent drive 20 provides for this two-to-one drive relationship. Said drive 20 can best be seen in FIGS. 1, 2 and 3 and has for its prime mover the gear 49.

The gear 49 is provided with a hub 72 on which is formed an outwardly projecting lug 73. On one side of said gear is provided a pressure disc 74 with friction packing 75 interposed between said flange and gear 49. On the opposite side of said gear is provided a ratchet wheel 76, a similar friction packing 77 being interposed between gear 49 and the ratchet wheel. Friction between the gear 49 and ratchet wheel 76 by means of said packing 75 and 77 is created by imposing pressure on disc 74, as by means of a compression spring 78 and a regulatable abutment knob 79. The ratchet wheel is keyed to shaft 50, as by a key 80 (FIG. 3). It will be clear from the foregoing that, unless the ratchet wheel is kept from turning, the gear 49, through the friction means provided, will drive shaft 50.

Normally, the ratchet wheel 76 is held against rotation by a pawl 81 on a pivot 82 of an index plate 83 which is mounted to oscillate on a bearing 84 concentric with the shaft 50. A spring 85 biases the pawl into such normal engagement with a tooth of the ratchet wheel. Said pawl is provided with a roller 86 that is in the path of the lug 73 on gear 49 and, when engaged by said lug, adapted to lift the pawl on its pivot 82 to free the ratchet wheel to rotate with gear 49. However, this release by pawl releases one tooth of the ratchet wheel at a time, 73 moves past the roller 86. As a consequence, the pawl releases one tooth of the ratchet wheel at a time, the spring 85 immediately biasing the released pawl to engagement with the oncoming tooth of the ratchet wheel. Thus, each full revolution of gear 49 advances the ratchet wheel one tooth and the shaft 50 that increment of a full rotation that is related to the number of teeth in the rachet wheel. Since the wheel 76 has sixteen teeth, the intermittent movement of shaft 50 is in sixteenths of a revolution.

By means of bevel gearing 87 connecting shafts 50 and 64, the mentioned intermittent advance of shaft 50 is imparted to the sleeve-indexing disc 63. Said gearing, in this case, is miter gearing because disc 63 has sixteen recesses 66. The indexing movement of disc 63 advances the sleeves S in said recesses from station to station in sixteenths of a revolution.

Since sleeve disc 55 has half the number of recesses as has disc 63, the same is driven, accordingly, by two-to-one gearing 88 that connects shaft 50 and a sleeve 89 through which shaft 47 extends, and by bevel or miter gearing 90 that connects said sleeve and shaft 56. Since shaft 50 rotates intermittently, the drive of disc 55 on shaft 56 is intermittent also.

The index plate 83 controls the valve 20 which is normally closed and is opened only when the ratchet wheel 76 forces the pawl 81 in a direction to open flow through said valve from the inlet 22, since, when the pawl is engaged with a ratchet tooth, the normal tendency of the mentioned friction between continuously driven gear 49 and the ratchet wheel will rock the index plate 83 in a direction to cause the same to engage and open valve 21. Thus, air passes through valve 21 at all times that the ratchet wheel is stationary as are the discs 55 and 63.

When the lug 73 raises the pawl to free it from the ratchet wheel, the index plate is freed to rock back against a stop 91, allowing the valve 21 to close until it is again opened by the next tooth of the ratchet wheel when the same engages the pawl as the latter is released by lug 73. Thus, valve 21 is intermittently opened and only when the compressed air passing therethrough is needed to carry out the air-operated functions of the machine.

The feeler means 23 is provided at a station of the disc 63 that is beyond where the sleeves S are received by the recesses 66 of said disc. FIGS. 4 and 5 show said means 23 which comprises a cylinder 92 mounted on the base top 40 in a vertical position, a piston 93 in said cylinder, and a stem 94 directed through the top of the cylinder and movable with the piston upon projection of the latter by compressed air supplied through the medium of control valve 21. Since said stem is directed to register with the bore of a sleeve S at the mentioned station and since the same is smaller than said bore, upon projection of the stem, the same will enter the sleeve bore and extend upwardly therebeyond. If there is no sleeve in register with the stem 94, the same will encounter an arm of a star wheel 95 which is carried on a vertical stub shaft 96 on the end of an arm 97 affixed to the upper end of the cylinder 92.

It will be seen that each time a sleeve S moves past the test station, the same encounters one of the star wheel arms and rotates the star wheel to bring the next arm in register with the station and with the stem 94. If no sleeve comes along to engage this next arm, the same remains in the path of projection of the stem and prevents projection thereof except for a short ineffective stroke. Only the displacement of said interfering arm by an oncoming sleeve will allow full and operative projection of said stem. The springs at 98 produce friction on the star wheel 95 which causes the same to retain the position to which moved by a sleeve. Whether fully projected or not, the stem is retracted by causing retraction of the piston 93 by air directed to the upper portion of the cylinder 92.

The valve 24 is positioned so that its stem 99 is engaged and retracted by the projecting stem 94 as the latter passes completely through the bore in the sleeve. The body 100 of said valve 24 is mounted on an arm 101 affixed to a standard 102 on base top 40. Said valve conducts therethrough air supplied through control valve 21, said air passing through suitable tubing 103 to the means 26 that controls release or feed of pins P from chute 25.

The chute 25 is also generally conventional in that the same may be fed in the usual way by a tumbling hopper so that pins P may be suspended by their heads H in generally the same way that the sleeves are suspended by their flanges F.

The means 26 releases pins from the chute one at a time but does so only when the valve 24 is opened to air flow. As a consequence, if the valve 24 is not operated by the stem 94 because no sleeve is in proper place, there will be no release of pins from chute 25. As seen in FIG. 11, the means 26 may comprise an air-operated device 104 that has a stem projected by air in tubing 103, the latter actuating a lever 105 or other means against the bias of a return spring 106. The means 105, when actuated, releases a pin P to assume a feed position over the entrance of guide tube 27.

Said guide tube 27 extends from its connection at 107 to base top 40 beneath where the chute 25 delivers pins P to a connection 108 extending upwardly from said top 40 directly beneath the station 109 of index disc 63, the same being one station removed from where the means 23 is disposed. As can be seen from FIG. 6, the connection 108 is provided with a spring collet chuck 110 which guides a pin P, grooved shank, first, into the bore of a sleeve S at station 109 when the pin is in the above-mentioned feed position over the connection 107 is pushed by means of its head into the guide tube 27.

It will be noted that the pins P enter tube shank down and that the 180° curvature of the tube inverts the pins so they exit past the chuck 110 shank up. As a consequence, the shanks of the pins are entered into the bores of sleeves S at station 109. The entry of such pins is a partial one, as seen in FIG. 6, the heads H remaining spaced, at this time, from the ends of the sleeves. By forming the collet 110 as a three jaw device with one jaw shorter than the other two and disposed on the side or path of advance of the means 19, the two longer jaws guide the pins as the same are ejected from the guide tube 27 and the shorter jaw provides clearance for the head of the pin during such advance.

The pin-feeding means 28 is shown in FIGS. 1, 2 and 10 and comprises a bearing 111 extending vertically into the base housing 15 from the top wall 40, a rack bar 112 guided in said bearing for vertical movement, an arm 113 affixed to the upper end of the rack bar 112, and a down-reaching pusher pin 114 carried by said arm in vertical alignment or register with a pin P in position over the entry connection 107 of the guide tube 27. It will be clear that upon each reciprocative movement of the means 28, the push pin 114 will project a pin P into said guide tube, thereby displacing all of the pins in said tube and discharging a pin from the connection 108, as above described.

The means 30 is best seen in FIGS. 3 and 8, the same comprising a bearing 115 extending downwardly into the interior of the base housing from top wall 40, a rack bar 116 guided for vertical movement in said bearing, and an adjustable push rod 117 disposed axially in the bar 116 and having an end directed toward and in register or alignment with the head H of a pin in a sleeve S at a station 118 of disc 63 that is in advance of the station 109. It will be realized that reciprocative movement of the rack bar 116 will cause the rod 117 to push pins P, from their partly retracted position, as in FIG. 6, to the fully projected position, as in FIGS. 7 and 8.

The drive means 31 originates with the drive shaft 52, the same comprising an eccentric crank 119 on the end of said shaft outside base wall 42, a link 120 connected by one end to said crank, and an arm 121 on a stub shaft 122 connected to the other end of said link. It will be clear that rotation of shaft 52, through the above-described mechanism, causes oscillation of the shaft 122. Said drive means further includes a gear segment 123 that is in mesh with rack bar 116 and, therefore causes reciprocation of said bar, as explained, an arm 124 affixed to shaft 122, a link 125 connected by one end to said arm 124, and a gear segment 126 that has free rotational bearing on shaft 52, is in mesh with the rack bar 112 and is connected to the other end of link 125, as at 127. Since, gear segment 126 is formed as an arm having free rotation on shaft 52, the above-described mechanism causes oscillation thereof independent of the continuous rotation of shaft 52 and, therefore, the described pin-feeding reciprocation of the means 28.

While valve 21 controls inlet of pressure air to the machine, the different air-operated components of the machine require independent control to operate by means of such air. To this end, the three air valves 32, or comparable means, may be provided as well as the means 33 for timing the operation of said valves, as desired. It will be seen from FIGS. 1 and 9 that the control valves, whether there are three, as shown, or more, are each provided with a stem 128 and that each stem is in operative engagement with one arm 129 of a bellcrank 130 on a pivot 131. The other arm 132 of each bellcrank is engaged by a cam 133. The above complement of cams is carried by drive shaft 51 and is driven thereby.

By such means, according to the design and synchronous relationship of the cams 133, the valves 32 may be opened and closed to effect the controls desired. As an example, the connections 134 that control movement, up and down, of the piston 93 of the means 23 (see FIG. 5), may be connected to one or more of the valves 32 and controlled, in desired synchrony, by the means 33. The same is true also of the connections 135, 136 and 137 of the washer-assembling means 35, and the connection 138 of the washer feed means 34.

The means 34, shown in FIGS. 1, 2 and 7 comprises a base 139 mounted on the housing top 40 and having a laterally directed slide guide 140 for a slide 141. Said base is interiorly hollow, having a vertical bore 142 that houses the later-to-be-described means 35. Offset from the bore, the guide 140 is provided with an upwardly open boss 143 from which upwardly extends a washer-holding chute 144. Washers W in said chute are adapted to be displaced, one-by-one by the slide 141 to a position axially aligned with said bore 142.

The means 34 further includes a bracket 145 which mounts a cylinder unit 146; the stem 147 is connected to the slide 141. Air is conducted to said cylinder through connection 138, as controlled by one of the valves 32 and the means 33 to extend stem 147 and cause projection of slide 141 and the mentioned lateral displacement of the bottommost washer in the stack thereof in chute 144. A spring within said unit 146 may be provided to retract stem 147 upon venting of the operating air.

The mentioned bore 142 is aligned or in register with a station 148 in advance of the station 118 where the pin P was fully projected into the bore of a sleeve S. A reduced bore 149 receives the displaced washer W and locates the same in vertical register with station 148.

The means 35 is designed to place washers on the sleeve S over the pin head H in a manner to compensate for stretch thereof while being forced over the head which is usually diametrally larger than the sleeve. Since the washer hole is desirably smaller than the sleeve so as to be snug thereon, the mentioned stretch and resultant deformation of the washer is compensated for by the means 35 that is illustrated.

Said means 35 is shown as a cylinder 150 mounted in the bore 142 of the base 139; an upper, outer and hollow plunger 151 having a piston 152 is fitted in said cylinder and is guided by a gland-like fitting 153 that closes the end of said cylinder and through which the plunger 151 may be projected; and a plunger 154 within the hollow of plunger 151 and provided with a lower stem part 155 that is provided with a piston 156 is also fitted in the cylinder 150. The stem part 155 defines an annulus 157 within the cylinder bore between the pistons 152 and 156.

The air connection 135 is arranged to conduct pressure air to said annulus 157, thereby causing projection of the plunger 151 while acting to hold the plunger retracted. The connection 136 conducts air to project plunger 154 by acting on the bottom face of the piston 156; and the connection 137 is connected to cause air to act on piston 152 to retract the plunger 151, thereby also retracting plunger 154 because of the engagement of plunger 151 with the annular shoulder 158 that is defined between the plunger 154 and the stem part 155.

It will be clear that, after a washer W has been positioned, as shown in FIG. 7, in the reduced bore 149, the means 33 first projects the outer plunger 151 which, because it is engaged only with the marginal portions of the washer, allows the washer to assume a conical form that facilitates its passing over the pin head H, as before explained. By means of projection of plunger 154, which engages the portion of the washer around the hole thereof, the middle or conically bulged part of the washer is forced over the pin head and onto the sleeve S. The sequential movement of the plunger 154 may be timed by the means 33 as desired. In this manner, the washer is pushed firmly against the sleeve flange F. Thereafter, the two plungers are retracted to their initial position under control of the means 33 preparatory to another washer being fed to the bore 149.

The completely assembled clinch pin, after it leaves station 148, encounters the means 36 which dislodges said pins from their seats in the disc 63, a chute (not shown) being provided for conducting the pins to a receptacle. Said means 36 is shown in FIGS. 1, 2 and 4 as comprising a pair of fixed stripping fingers 159, one above and one below the disc 63 and having curved edges 160 that engage upper and lower projecting portions of the assembled clinch pins and withdraw the same from their seats as the disc is indexed from station to station. Said fingers are carried by a post 161 that extends upwardly from the base top 40.

In order that the machine may be turned over without power, the shaft 47 is extended outside of the guard 45 and a handwheel 162 (FIG. 9) affixed thereto.

While the foregoing specification illustrates and describes what I now contemplate to be the best mode of carrying out my invention, the construction is, of course, subject to modification without departing from the spirit and scope of my invention. Therefore, I do not desire to restrict the invention to the particular form of construction illustrated and described, but desire to cover all modifications that may fall within the scope of the appended claims.

Having thus described my invention, what is claimed and desired to be secured by Letters Patent is:

1. The method of introducing the shank end of a headed pin into the longitudinal bore of a sleeve that has an annular flange nearer the end thereof that is opposite to the end in which the pin is introduced, said method consisting of feeding pins, headed ends up, and sleeves, with flanged portions up, guiding the pins with their headed ends up from the end of said feed into an arcuate path and moving the pins along the path in end-to-end abutment to invert said pins so that the shanks thereof are upwardly directed, transferring the sleeve from the end of its feed with an intermittent motion into a position in which the bore thereof is in register with the inverted pin, and pushing on the head of the last pin of a string of end-abutted pins in the curved path to, thereby, push the first pin of said string into the bore of said registered sleeve from beneath.

2. A method for introducing the shank ends of headed pins into the longitudinal bores of sleeves that are each provided with an annular flange nearer the end thereof that is opposite to the end into which the pin is introduced, said method consisting of: intermittently feeding the sleeves from station to station with the flange-provided portions thereof up and while supported by said portions, along an arcuate path in one plane; intermittently feeding the pins headed ends up and in end-abutted engagement so that an endwise push on the pin last fed to the path moves the pins along an arcuate path in a plane transverse to the plane of the first path and into register with and beneath a sleeve at a station of said first path, with the shank of the pin at said station directed toward the sleeve at said station; and pushing on the headed end of said last-fed pin to insert the shank of the pin at the mentioned station into the sleeve in register therewith while both said latter pin and sleeve are at the mentioned station.

3. The method according to claim 2 including the strip of testing the position of the sleeve in the path of movement thereof before the same reaches said station to determine whether said sleeve is in proper operative position, and continuing the feed of pins only when the test finds a sleeve in operative position.

4. The method according to claim 3 in which the introduction of pins is part way into the sleeves, and the step of pushing directly on the heads of the partly introduced pins to push the same into full entry into the sleeves.

5. The method of entering a headed pin into the bore of a sleeve that consists of feeding pins, one after the other, headed ends up and then placing the pins thus fed in line, with their headed ends up, into a curved path and moving the pins through the path in end-to-end abutment to invert said pins, so that the pins leave said path with their heads trailing, successively placing sleeves in position in register with the first pin in said path, and then, by pushing on the head of the last pin in said path, entering said first pin from beneath into a sleeve in register position.

6. The method according to claim 5 and further including the steps of moving the assembled pins and sleeve to a position offset from the path of pin feed, pushing on the head of the inserted pin to push the pin to full entry of the pin into the sleeve at said offset position.

7. The method according to claim 6 and providing the pin-provided sleeve with a resilient washer.

References Cited in the file of this patent

UNITED STATES PATENTS

| | | |
|---|---|---|
| 1,332,538 | Bourque | Mar. 2, 1920 |
| 1,657,101 | Zeitlin | Jan. 24, 1928 |
| 1,772,735 | Romine | Aug. 12, 1930 |
| 2,360,158 | Parks | Oct. 10, 1944 |
| 2,666,255 | McCoy et al. | Jan. 19, 1954 |
| 2,681,668 | Lubbert | June 22, 1954 |
| 2,757,447 | Barenyi | Aug. 7, 1956 |
| 2,795,842 | Van Nest et al. | June 18, 1957 |
| 2,927,333 | Stern | Mar. 8, 1960 |